United States Patent [19]

Holtz et al.

[11] Patent Number: 5,436,836
[45] Date of Patent: Jul. 25, 1995

[54] ELECTRONIC SYSTEM FOR AN ANTILOCK BRAKING SYSTEM WHICH ADJUSTS FOR VARIATIONS IN TIRE SIZE

[75] Inventors: Hans Holtz, Hanover; Helmut Pannbacker, Hemmingen; Erwin Petersen, Wunstorf; Gerald Stanusch, Harsum, all of Germany

[73] Assignee: W A B C O Standard GmbH, Hanover, Germany

[21] Appl. No.: 872,084

[22] Filed: Apr. 22, 1992

[30] Foreign Application Priority Data

Apr. 29, 1991 [DE] Germany .................. 41 14 047.8

[51] Int. Cl.⁶ .................. B60T 8/58; G01P 11/00
[52] U.S. Cl. .................. 364/426.02; 364/426.03; 303/93; 324/161
[58] Field of Search .................. 364/426.02, 426.03, 364/426.04, 565, 431.07; 303/93, 100, 102, 107, 108; 180/170, 176, 177, 197; 324/161

[56] References Cited

U.S. PATENT DOCUMENTS

| | | | |
|---|---|---|---|
| 4,566,737 | 1/1986 | Masaki et al. | 303/109 |
| 4,777,611 | 10/1988 | Tashiro et al. | 364/565 |
| 4,962,971 | 10/1990 | Miyake | 303/100 |
| 4,975,852 | 12/1990 | Fennel et al. | 364/426.02 |
| 5,005,132 | 4/1991 | Yoshino | 364/426.02 |
| 5,021,957 | 6/1991 | Yoshino et al. | 364/426.02 |
| 5,258,914 | 11/1993 | Schmitt | 364/426.03 |
| 5,262,951 | 11/1993 | Beyer et al. | 364/426.02 |
| 5,277,482 | 1/1994 | Beyer et al. | 303/92 |
| 5,312,169 | 5/1994 | Buschmann | 303/100 |

FOREIGN PATENT DOCUMENTS

| | | |
|---|---|---|
| 0293561 | 3/1988 | European Pat. Off. . |
| 2518816 | 12/1975 | Germany . |
| 3536019 | 4/1987 | Germany . |
| 3738914 | 5/1989 | Germany . |
| 8801028 | 6/1989 | WIPO . |

Primary Examiner—Kevin J. Teska
Assistant Examiner—Tan Nguyen
Attorney, Agent, or Firm—Meltzer, Lippe, Goldstein, Wolf, Schlissel & Sazer

[57] ABSTRACT

An electronic regulating system for regulating the supply of pressure medium to each brake cylinder of a vehicle having a plurality of wheels thereby preventing spinning of the wheels upon starting and locking of the wheels upon braking, comprises wheel speed sensors which detect the rotation of the wheels and which produce signals indicative of the individual rotational speeds of the wheels, and an electronic control unit which monitors the individual rotational speeds of the wheels and which controls the supply of the pressure medium to the brake cylinders based on the individual rotational speeds. The electronic control unit includes a speed signal processor which receives the signals produced by the wheel speed sensors and which determines the individual rotational speeds of the wheels and a vehicle reference speed therefrom. The electronic control unit further includes an evaluation and adjustment unit which detects any deviations between the vehicle reference speed and the individual rotational speeds, and which internally adjusts the individual rotational speeds to the vehicle reference speed if a deviation which is greater than a first predetermined amount but less than a second predetermined amount is detected during a fixed time period. However, if a deviation greater than the second predetermined amount is detected, no internal adjustment of the individual rotational speeds is made, but a warning light is turned on.

17 Claims, 2 Drawing Sheets

ELECTRONIC SYSTEM FOR AN ANTILOCK BRAKING SYSTEM WHICH ADJUSTS FOR VARIATIONS IN TIRE SIZE

BACKGROUND OF THE INVENTION

The instant invention relates to an electronic system for regulating vehicle braking and/or vehicle starting. The regulating system monitors the speeds of each of the vehicle wheels and detects deviations in the rotational speeds of the individual wheels from a mean speed.

A system of this general type is known from EP-A-29 35 61.

Electronic regulating systems which regulate braking or starting of a vehicle have been known for some time. Their functions are mainly to decrease to an optimal value brake slippage when the vehicle is braked, or wheel slippage when the vehicle is started. Such regulating systems are commonly known as antilock braking (ABS) systems and drive slip control (ASR) systems, respectively. As a result of the regulation provided by an ABS system, the stopping distance upon braking is reduced to a minimum while the maneuverability of the vehicle is maintained. In the case of an ASR system, spinning of the drive wheels is prevented upon starting and the starting of the vehicle is thus improved. Modern electronic regulating systems often combine both ABS and ASR functions in a single, integrated electronic regulating system.

To be able to provide reliable and optimal regulation, such systems require the most exact possible input data. The most important input data in this case are the rotational speeds of the wheels which are supplied by wheel sensors mounted at the peripheries of the wheels.

It is possible that in some cases the rotational speeds of individual wheels may continuously diverge from the mean value of the speeds of all the wheels or from the mean value of the speeds of the wheels mounted on a reference axle. These divergences can be caused by differences in tire diameters due to wear, due to manufacturing tolerances, or due to the fact that different types of tires are mounted on the front axle and on the rear axle. Such a pairing of dissimilar tire types does indeed occur in practice.

Differences in rotational speeds of the wheels can also be caused by a faulty installation of a pole wheel facing the wheel sensor. For instance, a pole wheel with 80 teeth could have been installed opposite a wheel where a pole wheel having 100 teeth was required. As a result, a wheel that appears to run too slowly would be sensed.

Because of wheels with different tire diameters or outer circumferences, early or belated slippage signals may be produced in a vehicle provided with ABS and/or ASR regulation. As a result, the quality of regulation, for example, the comfort provided by the regulation, is reduced.

Faulty installation of pole wheels on front and rear axles constitutes a safety problem, especially with antilock brake systems which utilize a reference speed derived from several individual wheel speeds. It may then occur that no pressure or insufficient braking power is applied to wheels or axles when individual wheels are sensed as running apparently at insufficient speed.

A method is already known according to which the speeds of all the tires are compared with each other so that individual tires with slightly higher rotational speeds can be detected in order to identify tires with insufficient air pressure (see, e.g., DE-OS 25 18 816). However, this patent document does not suggest an application to an antilock brake system or to starting regulation, and is not suitable for belted tires.

The above-mentioned EP-A-29 35 61, which deals essentially with the detection of turns, also deals with the detection of a smaller diameter in a so-called spare wheel which is mounted in case of failure of a normal wheel. Such spare wheels have an outer circumference that is up to 20% below that of standard wheels. Spare wheel detection is effected by comparing "turn travel signals" of the forward and rear axles.

If these signals are different from each other over a long period of time, the electronic system concludes that such a spare wheel has been mounted. By means of a reduction of the measured rotational speeds that is internal to the electronics, or by switching the logic, the deviations can be compensated for and regulation can be adapted to special situations. However, this known patent document does not give any further details.

It is the object of the instant invention to provide an electronic regulating system for vehicle braking or starting of the type mentioned initially so that when minor continuous speed variations of individual wheels occur, a better regulating quality is achieved.

SUMMARY OF THE INVENTION

This and other objects are achieved by the present invention, which provides an electronic regulating system for regulating the supply of a pressure medium to each brake cylinder of a vehicle having a plurality of wheels and thereby prevents spinning of the wheels upon starting and/or locking of the wheels upon braking, the electronic regulating system comprising wheel speed sensors associated with each of the wheels which detect the rotation of the wheels and which produce signals indicative of the individual rotational speeds of the wheels, and an electronic control unit connected to the wheel speed sensors which monitors the individual rotational speeds of the wheels and which controls the supply of the pressure medium to the brake cylinders based on the individual rotational speeds of the wheels. The electronic control unit includes a speed signal processor connected to the wheel speed sensors which receives the signals produced by the wheel speed sensors and which determines from them the individual rotational speeds of the wheels and a vehicle reference speed. The electronic control unit also includes a dynamic evaluation unit which determines whether there are any secondary influences, such as turns being made by the vehicle, which might affect the accuracy of the wheel speeds calculated by the speed signal processor. The electronic control unit further includes an evaluation and adjustment unit which detects any deviations between the vehicle reference speed and the individual rotational speeds, and which internally adjusts the individual rotational speeds to the vehicle reference speed if, when the secondary influences are not present, a deviation which is greater than a first predetermined amount but less than a second predetermined amount is detected during a fixed period of time. However, if a deviation greater than the second predetermined amount is detected, no internal adjustment of the individual rotational speeds is made, but a warning light is turned on.

BRIEF DESCRIPTION OF THE DRAWINGS

The invention is explained in greater detail through an embodiment shown in the drawings, wherein.

DETAILED DESCRIPTION OF A PREFERRED EMBODIMENT

Figure 1:
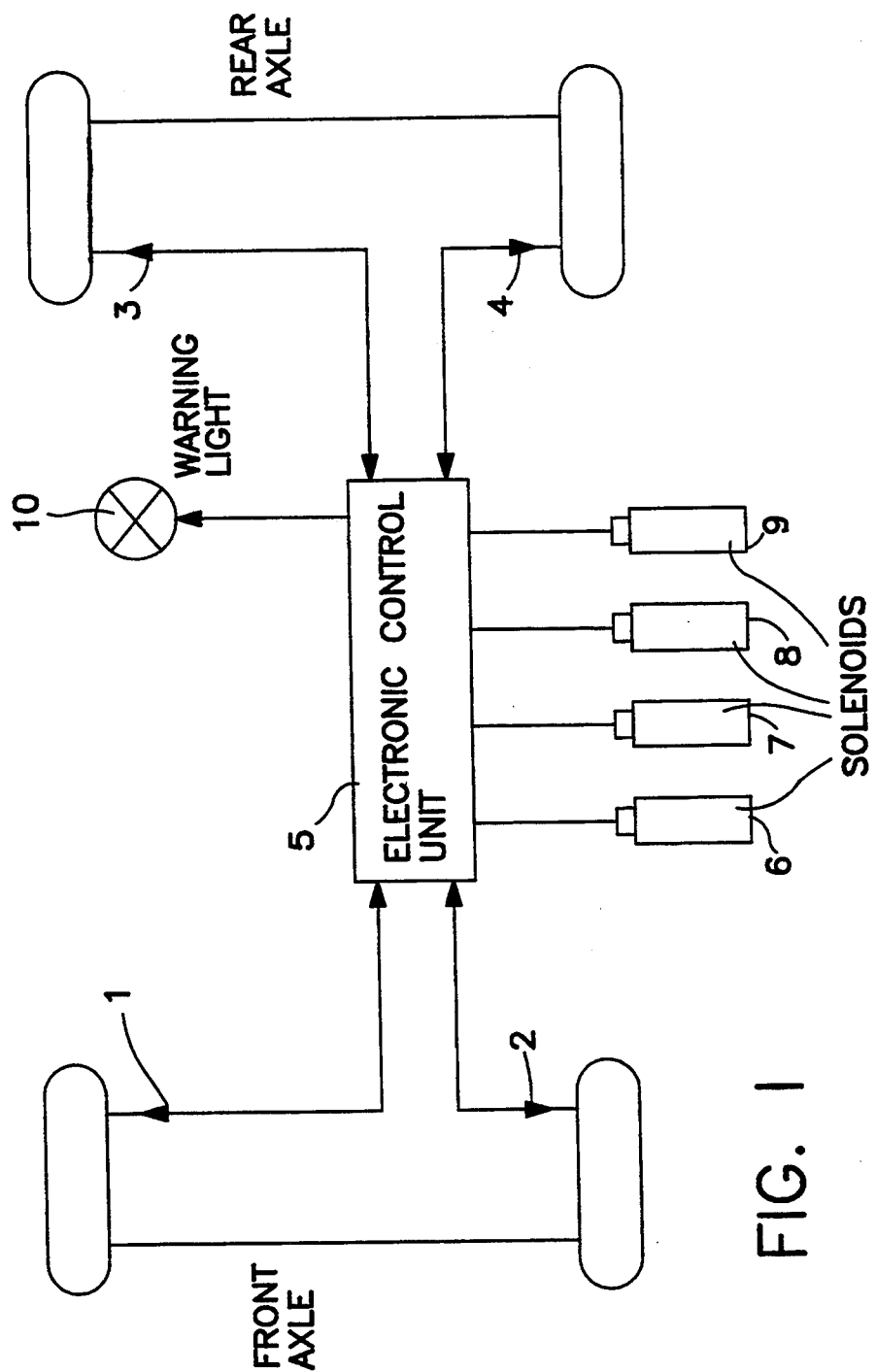
FIG. 1 shows a simplified schematic diagram of an ABS and/or an ASR regulating system.

An antilock braking and/or starting regulating system (ABS/ASR) for a four wheel vehicle in which the wheel speeds are detected by means of four wheel sensors (1) to (4) is shown schematically in FIG. 1. The vehicle is equipped with a forward axle (FA) and a rear axle (RA). If necessary, additional front or rear axles (not shown) may be provided. The signals from the wheel sensors (1) to (4) are transmitted to an electronic control unit (5). The latter contains one or more microcomputers (μC). Furthermore, the electronic control unit (5) contains additional switching components such as input elements for the wheel sensors, safety circuits, and amplifiers which are not shown in detail.

The electronic control unit (5) determines whether to send actuating signals to the solenoid valves (6) to (9) based upon the signals received from the wheel sensors (1) to (4). These valves are assigned to the individual wheels and are controlled so that they are able to influence the supply of pressure medium to the brake cylinders of the wheels. In ABS operation, it is thus possible to achieve a rapid drop in pressure so that a wheel which is at risk of becoming locked is allowed to rotate freely. In ASR starting regulation, it is possible to supply pressure medium to the brake cylinders of individual wheels that have begun to spin so that these wheels are braked, making starting possible.

A warning light (10) used to signal excessive continuous differences in the rotational speeds of individual wheels is also operated by the electronic control unit (5). The exact conditions under which this warning light is actuated are explained below. Thanks to the warning light (10) and appropriate diagnostic means, the driver is able to determine whether the diameter or outer circumference of one or more wheels differs to an unacceptable degree from that of the other wheels.

Figure 2:
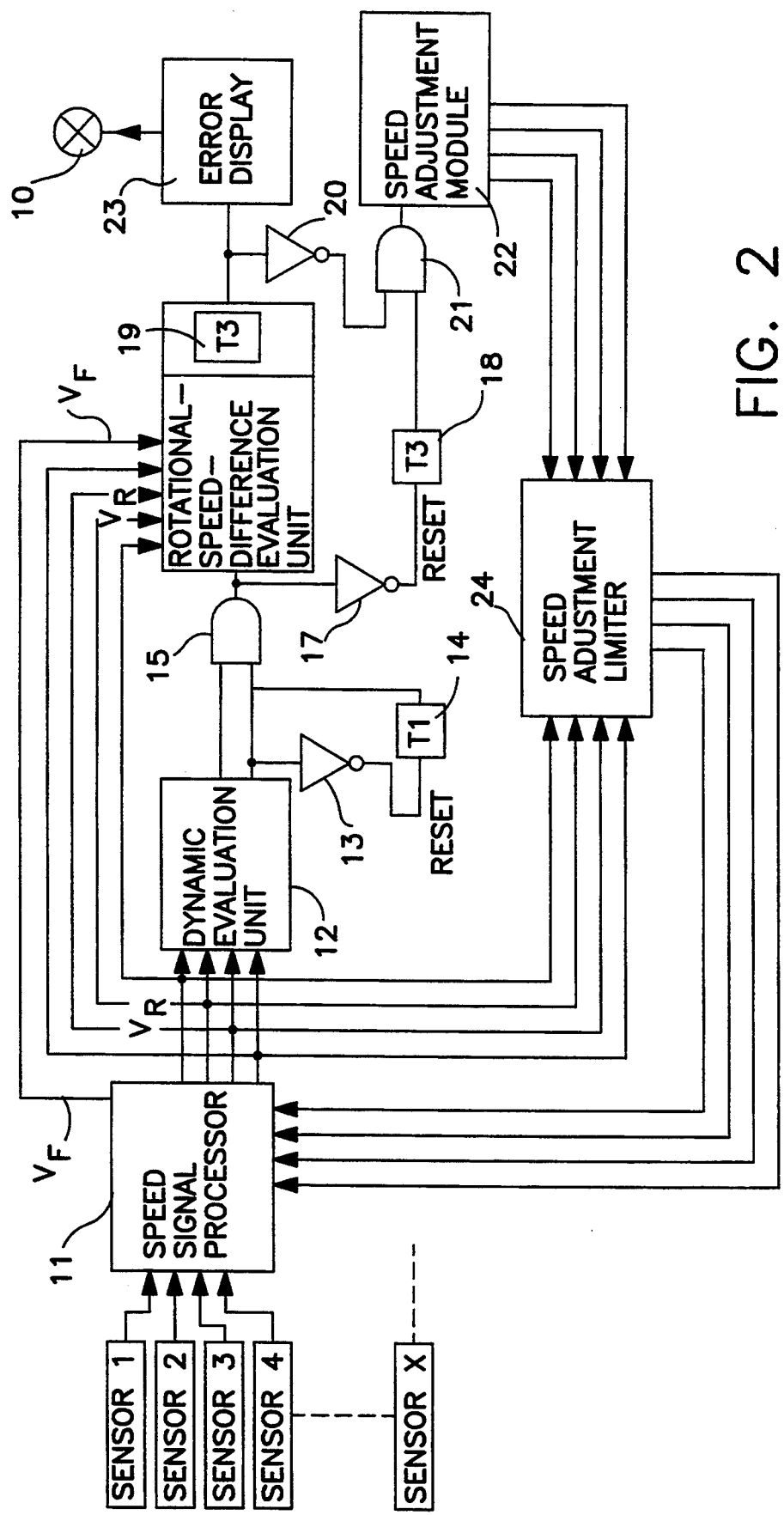
FIG. 2 shows a schematic diagram of the device according to the invention.

FIG. 2 shows in more detail part of the electronic control unit (5) of FIG. 1. On the left are the wheel sensors (1) to (4) and up to (x) in the case of additional wheels. They supply signals the periodic duration of which are inversely proportional to the associated wheel speed. The wheel sensors are connected to a speed signal processor (11). In the latter, the analog output signals from the wheel sensors (sinusoidal curves) are first converted into rectangular squarewave signals, which are then converted into digital velocity values. The speed is determined here by taking a constant value and dividing it by the applicable period of the rectangular squarewave signals.

The above-mentioned constant value is obtained from the outer circumference of the tires and the number of teeth of the built-in pole wheel whose rotation produces the velocity signals in the wheel sensors. A vehicle reference speed which is considered to be the vehicle speed ($V_F$) is calculated from two or more wheel speeds.

To ensure that the different wheel speeds are only monitored when the vehicle is traveling in a straight line, i.e., when the wheels are not subjected to secondary influences producing a build-up of speed differences between the wheels as a result of driving maneuvers (e.g., turns), the speed ratios among the different wheels are evaluated. This is carried out in a dynamic evaluation unit (12) in the following manner.

In the dynamic evaluation unit (12), the difference between the mean value of the wheel speeds from the rear axle (RA) and those from the front axle (FA) is determined as a percentage of the mean value of the wheel speeds from the front axle (FA) according to the following formula:

$$\frac{\text{Mean value (rear axle)} - \text{Mean value (front axle)}}{\text{Mean value (front axle)}} * 100\%$$

If the tire diameters are exactly equal, the number of teeth of the pole wheels are exactly equal, and the vehicle travels in a precisely straight line with freely rolling wheels, i.e., without braking, the result of the equation is zero. Unequal tire diameters, however, produce a value that is not equal to zero.

When going through a curve, the value is <0 since the front wheels travel a greater distance than the rear wheels in that case.

The calculation according the above-mentioned relationship is repeated constantly in the dynamic evaluation unit (12).

The result consists of reference values to which the value then calculated must adhere within a tolerance range, e.g., ±1% in order to produce a positive ("1") signal at the output of the block (12). In such case, it is assumed that the vehicle is travelling in a straight line. Otherwise, i.e., when the vehicle is travelling through a curve, a negative ("0") signal is produced at the output of the dynamic evaluation unit (12).

A positive ("1") signal at the dynamic evaluation unit (12), produced when the vehicle is traveling in a straight line, causes incrementation, i.e., the starting, of a counter (14) with a running time $T_1$ of 12 seconds, for example. A negative "0" signal causes the counter (14) to be reset to zero. An inverter (13) precedes the counter (14).

The counter (14) produces a positive signal after the running time $T_1$. The positive ("1") signal from the dynamic evaluation unit (12) and the output from the counter (14) are combined in an AND gate (15). The AND gate (15) then actuates a rotational-speed-difference evaluation unit (16) if the dynamic evaluation unit (12) delivers a positive result within 12 seconds. This means that the vehicle travels in a straight line at steady wheel speeds.

If this occurs, the individual wheel speeds ($V_R$) are checked in the rotational-speed-difference evaluation unit (16) for deviations from a reference speed, for example, from the vehicle speed ($V_F$). The rotational-speed-difference evaluation unit (16) obtains the values of $V_R$ and $V_F$ from the speed signal processor (11).

If the rotational speed difference given by

Vehicle speed ($V_F$) − Wheel speed ($V_R$)

for any one of the wheels is greater than approximately 10% of the vehicle speed ($V_F$) and therefore unacceptable, an internal counter (19) is incremented in the rotational-speed-difference evaluation unit (16). However, if the difference is less than approximately 10% and is therefore acceptable, the internal counter is reset. The rotational-speed-difference evaluation unit (16) then delivers a value "0" at the output.

If the internal counter (19) has registered in the rotational-speed-difference evaluation unit (16) a time $T_2$, e.g., 16 seconds, which is an unacceptable time, the rotational-speed-difference evaluation unit (16) supplies a "1" at its output and an error message is generated for the wheel with an excessive speed difference. The error message is transmitted to an error display (23) which includes the warning light (10) where it is stored or displayed.

In addition, another counter (18) is provided and is triggered by the dynamic evaluation unit (12) via the AND gate (15) and an additional inverter (17). This counter (18) is held on zero (reset) by the inverter (17) for as long as the rotational-speed-difference evaluation unit (16) has not been actuated. However, when the rotational-speed-difference evaluation unit (16) is actuated by the AND gate 15, the counter (18) is also incremented. When the counter (18) has reached a value corresponding to a time $T_3$, e.g., 30 seconds, it delivers a "1" signal at its output.

The relatively long period of 30 seconds ($T_3 > T_1$) ensures that the rotational-speed-difference evaluation unit (16) is able to recognize and signal a true unacceptable rotational-speed difference before a velocity adjustment (see below) will take place to even out said rotational-speed difference internally.

A "1" signal from the counter (18) and a "0" signal from the rotational-speed-difference evaluation unit (16) actuate a speed adjustment module (22) via the AND gate (21).

A "1" signal from the counter (18) and a "1" signal from the rotational-speed-difference evaluation unit (16), on the other hand, signify an unacceptably high rotational-speed difference over a longer period of time and actuate storage of the error in a memory device (not shown) and error display (23) by means of the warning light (10). In this case, however, the diverging wheel speed is not adjusted internally by means of the speed adjustment module.

The speed adjustment module (22) is connected via an additional AND gate (21) to the output of the counter (18) as well as to the output of the rotational-speed-difference evaluation unit (16) via an additional inverter (20). It is therefore actuated after completion of the time $T_3$ of the counter (18) if the speed of one of the wheels is not excessively different, e.g., less than 10% difference from the vehicle speed ($V_F$).

The speed adjustment module (22) adjusts the individual wheel speeds ($V_R$) to the vehicle reference speed. In some cases this may be accomplished when the constant values of the rear wheel speeds are adjusted internally by the speed adjustment module (22) to the speeds of the front wheels. This is done independently of the sign of the difference:

Front wheel speed − Rear wheel speed by constantly reducing or increasing the constant value (see above) which is used in the speed signal processor (11) for the rear wheels to calculate the speed.

However, the adjustment is made only within certain limits. An adjustment limiter (24) is provided for this. The individual wheel speeds ($V_R$) from the speed signal processor (11) and the adjusted values from the speed adjustment module (22) are supplied to the adjustment limiter for this purpose.

The adjustment limiter (24) works as follows:

The adjustment is only permitted within predetermined speed limits. It is no longer continued when the change of the constant values exceeds, for example, ±9% of their original values or when the difference between front wheel speed and rear wheel speed is smaller than a value of approximately 0.5 km/h.

The adjustment signals limited in the adjustment limiter (24) are transmitted to the speed signal processor (11) where they cause the division constants to be adapted as mentioned earlier. It is also possible to design the entire circuit with discrete modules, or with one microcomputer per program.

The monitoring and adjustment processes take place advantageously each time the electronic regulating system is switched on. An adjusted tire ratio can be calculated from the adjustment needed to equalize the individual wheel speeds and the adjusted tire ratio can be stored in a data memory (not shown) which remains in the electronic system. New values of the adjusted tire ratio will be entered only when the difference between them and the old values is sufficiently great. Protection against sudden changes is thus increased and the frequency of rewriting this ratio in memory is reduced. A permanent memory has the advantage that a sufficient adjustment is made immediately for a vehicle with constantly uneven tire sizes.

The adjusted tire ratio which is stored internally can be displayed by means of a display unit, a blinking signal or an external diagnostics device and can be checked by it.

If a difference between front and rear tires is known, it is also possible to adjust the electronic system accordingly from the outside, i.e., by setting the adjusted tire ratio externally. This can be done by the vehicle manufacturer or at the workshop.

Finally, it is also possible to carry out an external adjustment process by a specially trained individual (in particular, a customer service specialist) by means of switch signals or some other intervention mechanism when the vehicle has been tested under free-rolling and steady conditions. These steady conditions can also be determined by a circuit that may not be integrated in the ABS/ASR electronic system, for example, by determining the state of the drive train (uncoupled, or transmission in neutral position) and of all brakes (e.g., service, retarder and locking brake not actuated). If steady free rolling of the vehicle is ensured by the driver or by such a circuit, the adjustment process can be carried out rapidly in larger steps and/or without the counter $T_3$.

In antilock brake systems the electronic systems of which are divided along two separate diagonal circuits, it is advantageous to carry out the above-described adjustment of the wheel speeds also along a diagonal. This means that the rear wheel speed is adapted to the speed of the corresponding diagonally opposed front wheel. The front wheel is thus used as a reference quantity for the adjustment.

While the invention has been described by reference to specific embodiments, this was for purposes of illustration only and should not be construed to limit the spirit or the scope of the invention. Numerous alternative embodiments will be apparent to those skilled in the art and are considered to be within the scope of the invention.

We claim:

1. An electronic regulating system for an antilock braking system which adjusts for variations in tire size, comprising:
   wheel speed sensors which detect the rotation of each wheel of a vehicle and which produce signals indicative of individual rotational speeds of said wheels,
   brake pressure control devices by means of which a pressure medium is supplied to brake cylinders assigned to said wheels,
   an electronic control unit connected to said wheel speed sensors and said brake pressure control devices which monitors the individual rotational speeds of said wheels and which controls actuation of said brake pressure control devices to supply said pressure medium to each of said brake cylinders based on said individual rotational speeds of wheels, said electronic control unit comprising:
   (a) speed signal processing means connected to said wheel speed sensors for receiving said signals produced by said wheel speed sensors and for determining therefrom said individual rotational speeds and a vehicle reference speed, said vehicle reference speed being calculated from said individual rotational speeds,
   (b) means for detecting the presence of influences other than the variations in tire size which influences produce a deviation between said individual rotational speeds and said vehicle reference speed, and
   (c) evaluation and adjustment means connected to said speed signal processing means and to said detecting means, for detecting actual deviations between said vehicle reference speed and said individual rotational speeds, for adjusting said individual rotational speeds within said evaluation and adjustment means to said vehicle reference speed if an actual deviation resulting from the variations in tire size which is greater than a first predetermined amount but less than a second predetermined amount is detected for any wheel for a fixed period of time, and for actuating a warning display but not adjusting said individual rotational speeds to said vehicle reference speed within said evaluation and adjustment means if said actual deviation resulting from the variations in tire size which is greater than said second predetermined amount.

2. The electronic regulating system of claim 1 wherein said fixed period of time is between 12 to 20 seconds.

3. The electronic regulating system of claim 1 wherein said first predetermined amount is about 0.5 km/hr.

4. The electronic regulating system of claim 1 wherein said second predetermined amount is about 10% of said vehicle reference speed.

5. The electronic regulating system of claim 1 further comprising means connected to said evaluation and adjustment means for limiting the amount of adjustment permitted for any wheel.

6. The electronic regulating system of claim 1 wherein said vehicle reference speed is determined as the mean speed of the front wheels when said influences are not present.

7. The electronic regulating system of claim 1 wherein said electronic control unit monitors and adjusts said individual rotational speeds each time said electronic regulating system is turned on.

8. The electronic regulating system of claim 1 wherein said evaluation and adjustment means further comprises means for calculating an adjusted tire ratio based on the magnitude of the adjustment made to said individual rotational speeds within said evaluation and adjustment means, and memory means for storing the adjusted tire ratio of said wheels.

9. The electronic regulating system of claim 8 wherein said memory means is volatile.

10. The electronic regulating system of claim 8 wherein said memory means is non-volatile.

11. The electronic regulating system of claim 8 wherein said adjusted tire ratio is stored in said memory means only if the difference between a current adjusted tire ratio and a previously stored adjusted tire ratio is greater than a predetermined minimum value.

12. The electronic regulating system of claim 8 further comprising means for displaying said adjusted tire ratio.

13. The electronic regulating system of claim 8 further comprising means for setting externally said adjusted tire ratio stored in said memory means.

14. The electronic regulating system of claim 8 wherein said evaluation and adjustment means detects deviations between said vehicle reference speed and non-adjusted individual rotational speeds, and wherein said evaluation and adjustment means takes said stored adjusted tire ratio into account in determining whether to adjust said individual rotational speeds.

15. The electronic regulating system of claim 1 wherein said electronic control unit controls the supply of pressure medium to diagonally opposed wheels, and wherein said evaluation and adjustment means adjusts the individual rotational speeds of said diagonally opposed wheels so that they are equal.

16. The electronic regulating system of claim 1 wherein said detecting means detects whether said vehicle is travelling in a curve.

17. A method for regulating an antilock braking system of a vehicle with wheels, said antilock braking system having an electronic control unit, said method comprising:
   (a) determining individual rotational speeds of the wheels of said vehicle,
   (b) calculating from said individual rotational speeds a vehicle reference speed,
   (c) detecting whether there are present any influences other than variations in tire size which would produce a deviation between said individual rotational speeds and said vehicle reference speed,
   (d) detecting whether there is any actual deviation between said individual rotational speeds and said vehicle reference speed which actual deviation results from variations in tire size,
   (e) resetting within said electronic control unit said individual rotational speeds to said vehicle reference speed if said actual deviation is greater than a first predetermined amount but less than a second predetermined amount and said actual deviation persists for a fixed period of time, and
   (f) turning on a warning signal if said actual deviation is greater than said second predetermined amount.

* * * * *